US006447198B1

United States Patent
Schmidmeier

(10) Patent No.: US 6,447,198 B1
(45) Date of Patent: Sep. 10, 2002

(54) BAMBOO TUBE CONNECTION

(76) Inventor: Alexander Schmidmeier, Chesa Laret, 7524 Zuoz (CH)

(*) Notice: Subject to any disclaimer, the term of this patent is extended or adjusted under 35 U.S.C. 154(b) by 0 days.

(21) Appl. No.: 09/456,563

(22) Filed: Dec. 8, 1999

(30) Foreign Application Priority Data

Dec. 8, 1998 (EP) .............................. 98123375

(51) Int. Cl.[7] ................................ F16B 9/02
(52) U.S. Cl. ................ 403/263; 403/258; 403/260
(58) Field of Search ................ 403/296, 186, 403/196, 201, 231, 252, 259, 266, 263, 294, 374.3, 396, 408.1, 241, 254, 255, 256, 258

(56) References Cited

U.S. PATENT DOCUMENTS

| 3,804,542 A | * | 4/1974 | Hammerschmidt | 403/264 |
|---|---|---|---|---|
| 3,835,610 A | * | 9/1974 | Harper et al. | 52/755 |
| 3,836,267 A | * | 9/1974 | Schatz | 403/296 X |
| 3,845,604 A | * | 11/1974 | Ottosson | 52/758 |
| 3,923,217 A | * | 12/1975 | Dean, II et al. | 224/9 |
| 4,013,372 A | * | 3/1977 | Lay et al. | 403/258 X |
| 4,021,129 A | * | 5/1977 | Sykes | 403/255 X |
| 4,261,665 A | * | 4/1981 | Hsiung | 403/231 |
| 4,261,667 A | * | 4/1981 | Ervin et al. | 403/231 X |
| 4,264,230 A | * | 4/1981 | Vanderminden | 403/259 X |
| 4,402,625 A | * | 9/1983 | Rechkin | 403/7 |
| 4,514,107 A | * | 4/1985 | Moreno | 403/231 |
| 4,701,065 A | * | 10/1987 | Orosa | 403/263 |
| 4,923,322 A | * | 5/1990 | Burg | 403/255 X |
| 5,433,805 A | * | 7/1995 | Schmidmeier | 156/84 |
| 5,720,570 A | * | 2/1998 | Cole et al. | 403/256 |
| 5,727,897 A | * | 3/1998 | Liu | 403/260 X |
| 5,765,960 A | * | 6/1998 | Carpinella | 403/260 |
| D411,693 S | * | 6/1999 | Navone | D6/369 |
| 1,734,340 A | * | 6/1999 | Overton | 403/258 X |

* cited by examiner

Primary Examiner—Lynne H. Browne
Assistant Examiner—David E. Bochna
(74) Attorney, Agent, or Firm—Crowell & Moring LLP

(57) ABSTRACT

A bamboo tube connection includes a first bamboo tube and a second bamboo tube, the first and second bamboo tubes being in butting relationship, possibly at an angle to each other. A longitudinal insert member is fixed in at least the first bamboo tube in an end region thereof. A longitudinal connector at least indirectly releaseable connects the longitudinal insert member to the second bamboo tube. In one embodiment the insert member is so positioned in the longitudinal direction in the first is a bamboo tube so that, when the tubes are connected together, the second bamboo tube is pressed with its peripheral surface against an end face of the insert member.

39 Claims, 8 Drawing Sheets

BAMBOO TUBE CONNECTION

BACKGROUND OF THE INVENTION

1. Field of the Invention

The invention relates to a bamboo tube connection and an arrangement for making a connection between bamboo tubes.

By way of indication a typical situation of use for such a connection is in the production of articles of furniture, for the assembly for example of beds, sofas, chairs, couches and the like from bamboo tubes.

2. Discussion of the Background

A problem which arises in connection with the production of articles of furniture, for example consisting of bamboo tubes as a support structure, is that despatch of the article in the finished assembled condition frequently involves a very large volume for transportation, and this therefore entails a high level of transportation costs. It is therefore increasingly the practice for articles of furniture to be delivered in a 'knocked-down' or 'flat-pack' form.

In that respect, consideration may be given to U.S. Pat. No. 4,701,065 which discloses producing corner connections consisting of bamboo tubes, in which one bamboo tube meets in butting relationship another continuous bamboo tube in which a longitudinal insert member is introduced into the tube which terminates in a butting configuration, and is joined to the other tube.

It will be noted however that it is necessary to provide a blind hole corresponding to the diameter of the tube which ends in a butting configuration, in the peripheral surface of the other tube, with the bottom thereof then being pressed against the end face of the tube with a butting end.

SUMMARY OF THE INVENTION

An object of the present invention is to provide a bamboo tube connection and in particular a releaseable bamboo connection which can be assembled in a simple rapid fashion to afford a high-stability connection formed from the bamboo tubes, for example for constituting a ready-for-use article of furniture.

Another object of the present invention is to provide a releaseable bamboo tube connection, more specifically both an angled connection and also for aligned longitudinal connection, which can be used for articles of furniture consisting of bamboo tubes to permit despatch thereof in the form of portions of the article of furniture or even in the form of individual bamboo tubes, permitting the article of furniture to be assembled quickly and easily at its intended place of use to afford a high-stability structure.

In accordance with the principles of the present invention the foregoing and other objects are attained by the bamboo tube connection and connecting arrangement set forth herein.

It will be noted that the form of connection that is most frequently required is a corner connection which in particular defines a right-angled configuration. In contrast to producing articles of furniture using connectors in plate shape, by a procedure whereby the plates are frequently fitted to each other in a bevel configuration in the corner region, bamboo tubes are generally brought into butting relationship with each other, wherein an end face of a first bamboo tube which meets the second bamboo tube in butting relationship can either be cut to length to form a flat end face or it can have a for example part-circular or channel-shaped recess to adapt it to the external contour of the second bamboo tube.

A first aspect of the configuration according to the invention lies in a longitudinal connector which extends in the longitudinal direction of a first bamboo tube, in particular in the center thereof, into the other bamboo tube, and is held therein in insert members which are arranged fixedly with the bamboo tubes and which comprise any suitable material, for example generally wood, and which are disposed fixedly in the interior of the respective bamboo tubes.

In such a case, the longitudinal connector used can be a screw, which permits the two tubes to be tightened to each other to any desired degree, at any event without leaving play therebetween, or alternatively it is possible to use transverse dowels or pin members which are fitted through the longitudinal connector in positively locking relationship therewith.

Another configurational aspect of the invention involves screwing angle assembly members to first and second bamboo tubes which are secured together in a corner configuration, with the angle assembly members being disposed in the internal angle formed by the two tubes.

In another aspect, when dealing with tubes which are in alignment, for connecting bamboo tubes extending in parallel relationship, a longitudinal insert member which extends in the interior across the join between the bamboo tubes is non-rotatably fixed in the two bamboo tubes, for example by means of transverse dowels or pin members. When dealing with tubes which are disposed in parallel relationship, with or without a longitudinal insert member, one or more transverse dowels or pin members can be fitted for example by being driven through the walls, which are disposed in mutually side-by-side relationship, of the bamboo tubes to be connected.

Further objects, features and advantages of the invention will be apparent from the description hereinafter of preferred embodiments thereof.

DESCRIPTION OF THE PREFERRED EMBODIMENTS

It will be noted at this juncture that a basic problem involved in connecting bamboo tubes together is that bamboo tubes in the natural state are substantially hollow and have transverse wall portions only at given spacings along the length thereof. For the purposes of using the bamboo tubes for building for example articles of furniture however those transverse wall portions are frequently also removed in order to prevent cracking of the bamboo tubes.

That means that the bamboo tubes used are often completely hollow in their interior. Nonetheless, the aim and intention when using bamboo tubes for purposes such as making connections for producing furniture is to ensure that the connections between bamboo tubes are as far as possible invisible to anyone looking at the assembled bamboo tubes. This generally means that a corner connector has to be very substantially disposed in the interior of the tubes.

Figure 1:
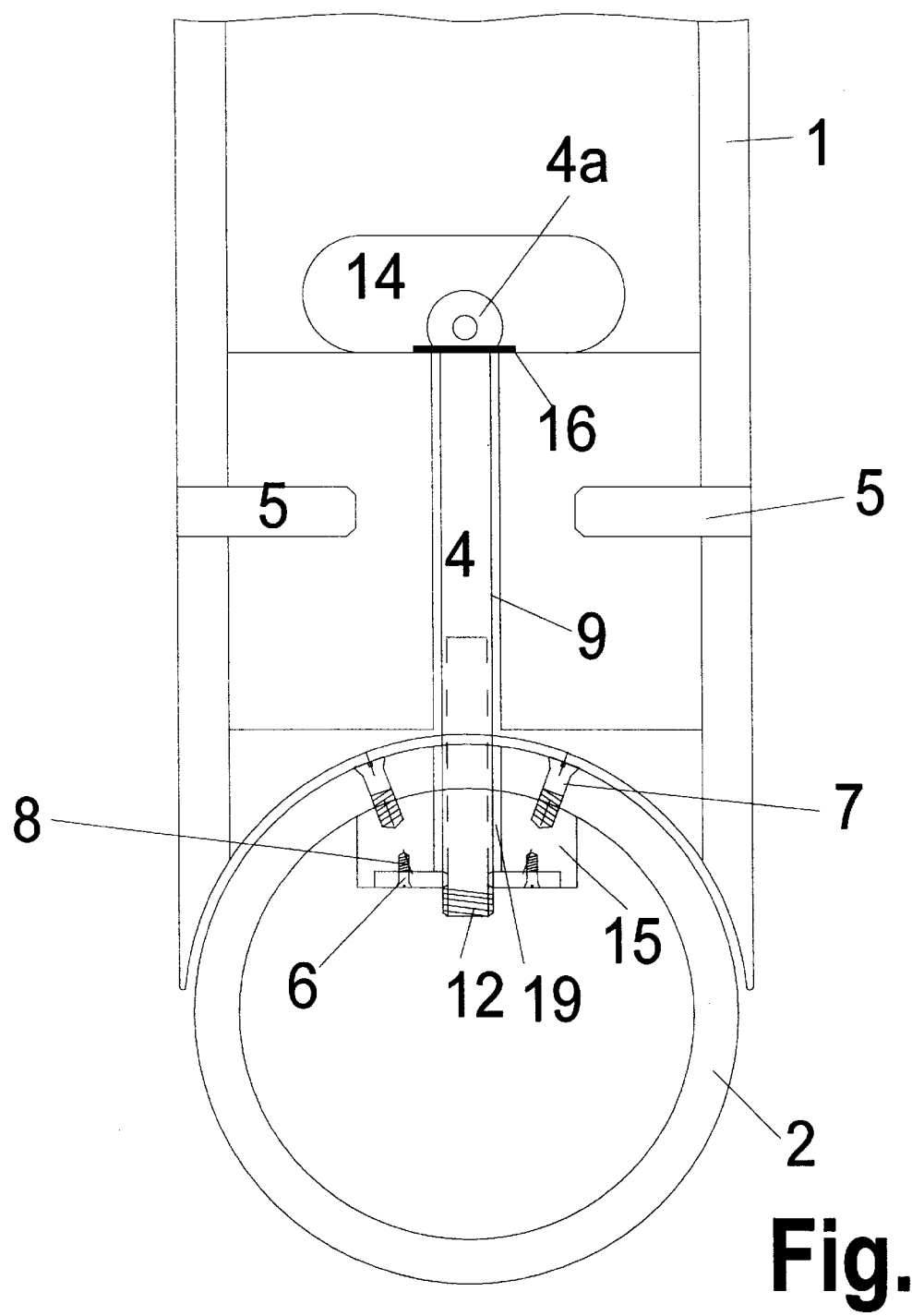
FIG. 1 is a partly sectional view of an internally disposed corner connection with tubes which are adapted in shape to each other.

Reference will now be made to FIG. 1 showing a first bamboo tube 1 in longitudinal section and a second bamboo tube in cross-section. The end of the bamboo tube 1 terminates in the form of a part-circular recess or channel which matches the outside peripheral surface of the second bamboo tube 2 which in this embodiment extends transversely with respect to the first bamboo tube 1. The diameters of the part-circular recess at the end of the bamboo tube 1 and the periphery of the bamboo tube 2 are therefore at least approximately the same.

The connection between the bamboo tubes 1 and 2 is made by means of a connecting arrangement comprising a longitudinal insert member 3 in the form of a cylindrical portion of a suitable material such as wood, the outside diameter of which is suitably matched to the inside diameter of the bamboo tube 1 and which is inserted into same from the free end thereof. The longitudinal insert member 3 is fixed in the interior of the bamboo tube 1 by first and second transverse dowels or pin members 5 being fitted from the outside through the bamboo tube 1, through the wall thereof, and into the insert member 3, and possibly being glued in position there, as also the outside periphery of the insert member 3 may be glued to the inside periphery of the bamboo tube 1. In that respect the longitudinal position of the insert member 3 in the bamboo tube 1 is so selected that when the tube 2 is pressed on, that bamboo tube 2 presses with its peripheral wall surface against the end face of the insert member 3, without, however, the tube 2, being pressed against the end face of the bamboo tube 1 which is adapted to the external peripheral contour of the bamboo tube 2, in order thereby to prevent the bamboo tube 1 from splitting.

The connection is made by means of a longitudinal connector in the form of a longitudinal screw 4 which is inserted through a somewhat larger longitudinal bore 9 provided centrally in the insert member 3, from the side of the insert member 3 that is remote from the bamboo tube 2. In that way, the head 4a of the screw 4 is supported, with the interposition of a support washer or disk 16, against the end face of the insert member 3, that is remote from the bamboo tube 2. The length of the longitudinal screw 4 is such that it passes entirely through the insert member 3 and projects into the interior of the second bamboo tube 2. At the free end thereof, which is within the interior of the bamboo tube 2, the screw 4 is tightened and braced by means of a nut 6 which is screwed thereon. It will be noted however that the nut 6 does not bear directly against the inside peripheral surface of the bamboo tube 2 but, for reasons of distribution of forces and a reduction in the pressure applied in relation to surface area, the nut 6 bears against a transverse insert member 15 which is fitted to the inside diameter of the second bamboo tube 2 in the region in which the screw 4 passes therethrough. For that purpose, more particularly on its side which is towards the inside peripheral wall surface of the bamboo tube 2, the transverse insert member 15 is of an external contour which corresponds to that internal contour, whereas on the opposite side against which the nut 6 bears, it has a flat surface for the nut 6 to bear firmly thereagainst, or it may also have a recess for receiving the nut 6 in sunk relationship therein. In that case the nut 6 is preferably additionally secured in the transverse insert member 15 by way of nut screws 8, just as the transverse insert member 15 can be secured to the bamboo tube 2 by fixing screws 7 which are driven through the bamboo tube 2 from the outside into the transverse insert member 15. The nut 6 can also be a drive-in nut.

The transverse insert member 15 and the wall of the bamboo tube 2, being the wall which is towards the bamboo tube 1, also have a transverse bore 19 extending therethrough, for the longitudinal screw 4 to be passed therethrough, being suitably dimensioned and positioned for that purpose.

In that arrangement the fixing screws 7 are disposed outside the transverse bore 19 but within the region where the bamboo tube 1 meets the bamboo tube 2 in butting relationship, so that the fixing screws 7 are not visible to a person looking at the releaseable tube connection between the first and second bamboo tubes where they meet in butting relationship at end regions thereof at an angle between the bamboo tubes.

The connection is braced by the screw 4 being screwed into the nut 6 which is non-rotatably fixed in the transverse insert member 15. For that purpose, provided in the wall of the bamboo tube 1 in the region of the head 4a of the screw 4 is an opening 14 so that it is possible to have access to the head 4a of the screw 4 by means of a suitable tool, for example a bar which can pass through the head 4a of the screw 4. In that case, the head 4a of the screw 4 has a suitable opening for inserting the bar tool therein.

In this arrangement, the opening 14 in the wall of the bamboo tube 1 is preferably disposed on that side of the tube 1 which cannot be seen by a person looking at the connection in a finished assembled article of furniture, for example, when considering a bed frame, for example in the internal angle of the corner connection produced in that way.

In addition the open ends of the bamboo tubes are covered over by suitable closure or finishing means such as rattan weave, suitable wood trim items or the like. This would therefore involve for example the open end of the tube 2 so that the transverse insert member 15 which is disposed at that location together with the nut 6 as well as the free end of the screw 4 are not visible.

In terms of the assembly sequence it is therefore important, in relation to the bamboo tube 2, to fix the transverse insert member 15 with the nut 6 in the interior of the bamboo tube, including the provision of the transverse bores 19 in the tube 2 and in the transverse insert member 15, before the tube 2 is closed for example by rattan weave at its free end.

The tube 2 is then pressed against the other tube 1 and the screw 4 is passed through the wall opening 14 into the interior of the tube 1 and inserted into the longitudinal bore 9 in the longitudinal insert member 3 and tightened by screwing in the nut 6, thereby making the connection firm.

Then, for visual reasons, the wall opening 14 can if desired be closed off for example by a brass plate, an accurately fitting bamboo insert member or similar cover portion.

If in contrast there is no need for the bamboo tube 2 in which the transverse insert member 15 is disposed to be closed off at the end, for example because the bamboo tube is a vertical tube which stands with its lower end face on a support surface so that the lower end can remain open, then a nut 6 can be loosely fitted on to the screw 4 through the opening which remains free and clear at the lower end of the bamboo tube 2, and then tightened. In that case however the screw 4 must be non-rotatably arranged in the longitudinal insert member 3, for example by comprising a shank which is at least in part of a non-round configuration and which is then disposed in positively locking relationship in a suitably shaped longitudinal bore 9, or by projections, prongs or the like on the contact surface of the head 4a of the screw 4 being pressed against the corresponding end face of the longitudinal insert member 3 when the assembly is tightened, so that the projections, prongs or the like dig into the longitudinal insert member 3.

The use of a nut 6 which is loosely screwed on in that way means that it is possible under some circumstances to forego the provision of the opening 14 in the wall of the bamboo tube 1.

Figure 2:
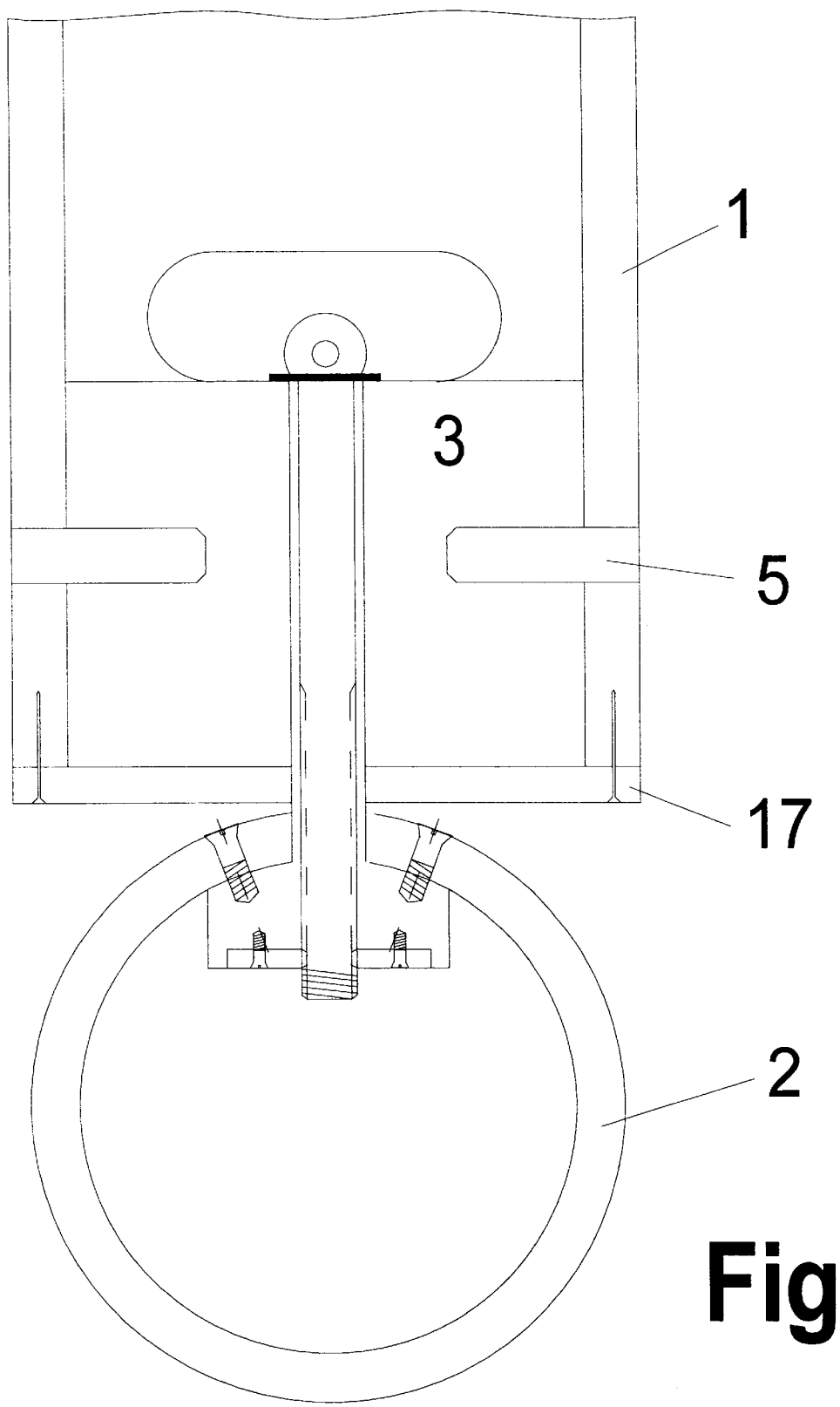
FIG. 2 shows a corner connection similar to that of FIG. 1 but in which the tubes are not adapted in shape to each other.

The structure shown in FIG. 2 differs from that shown in FIG. 1 in that, at its end, the first bamboo tube 1 is not of a part-circular or channel-shaped configuration so as to adapt it to the outside peripheral surface of the second bamboo tube 2, but rather the end of the first bamboo tube 1 is flat and is thus disposed at a right angle to the longitudinal axis of the bamboo tube 1, being terminated at that location by means of an end plate 17 which is fitted, in particular by screw means, on to the bamboo tube 1 at the end thereof. The outside periphery of the plate 17 corresponds to the outside periphery of the bamboo tube 1, whereby the end of the bamboo tube 1 is suitably closed by the plate 17. The plate 17 is fixed to the bamboo tube by screws which are screwed into the wall of the bamboo tube 1 in the lengthwise direction thereof, or alternatively or in addition the plate 17 may be glued to the bamboo tube 1. Preferably, the longitudinal insert member 3 directly adjoins the end plate 17 and, instead of or in addition to the illustrated transverse dowels or pin members 5, can also be screwed to the end plate 17 or can be formed in one piece together with the plate 17. It is also possible to omit the plate 17 and to use a longitudinal insert member 3 which is a visually sufficiently exact fit in the bamboo tube.

It will be noted moreover that, in all the design configurations of the invention illustrated herein, the longitudinal insert member 3 does not have to be precisely of an external contour which corresponds to the internal contour of the bamboo tube 1 in which it is fitted. A quadrangular contour for the longitudinal insert member 3 with for example beveled or cut-off corners is also possible as long as it is possible to provide for a non-rotatable connection between the longitudinal insert member 3 and the bamboo tube 1, for example by means of transverse dowels or pin members 5 or other fixing means.

Figure 3:
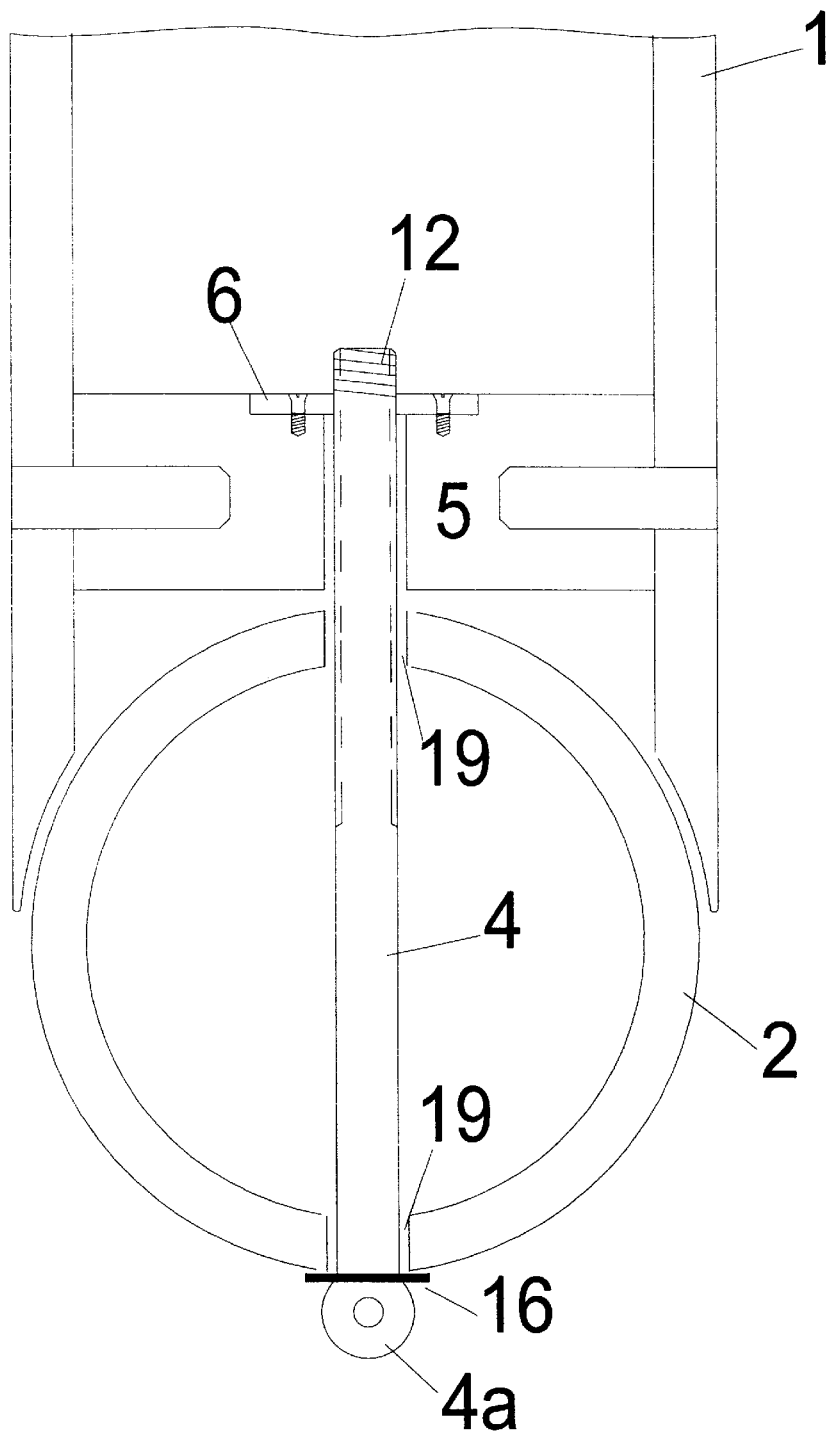
FIG. 3 is a similar view to FIG. 1 of another embodiment with bamboo tubes adapted to each other.

Reference will now be made to FIG. 3 showing a structure which differs from that shown in FIG. 1 by virtue of the direction of insertion of the longitudinal screw 4. It will be noted that, in its broad outlines, the structure shown in FIG. 3 corresponds to that shown in FIG. 1 and therefore a detailed description thereof will not be repeated at this point.

It will be seen from FIG. 3 that the end of the bamboo tube 1, that is towards the second bamboo tube 2 at a right angle thereto, is also adapted in a part-circular or channel-shaped configuration to the outside contour of the bamboo tube 2. The longitudinal screw 4 however is introduced from the side of the bamboo tube 2, that is remote from the bamboo tube 1, while the nut 6 is disposed at the end of the longitudinal insert member 3, that is remote from the bamboo tube 2.

In FIG. 3, the screw 4 is introduced into the bamboo tube 2 from the side thereof remote from the bamboo tube 1 so that it passes through the walls of the bamboo tube 2 at both sides thereof, and the head 4a of the screw 4 on the peripheral side of the tube 2 remote from the tube 1 projects therefrom and at that location is supported against the outer peripheral surface of the bamboo tube 2, for example with the interposition of a washer 16.

It will be appreciated that it is also possible however for the screw 4 to be substantially shorter so that the head 4a thereof is disposed in the interior of the tube 2 and is supported thereat, possibly against a transverse insert member 15 as is used in the structure of FIGS. 1 and 2 respectively.

In that case the screw 4 has to be introduced from the free end of the tube 2, which is possible only when the end of the bamboo tube 2 is permanently open.

In the FIG. 3 structure the nut 6 is also non-rotatably fixed in the longitudinal insert member 3, as described hereinbefore with reference to FIG. 2.

Figure 4:
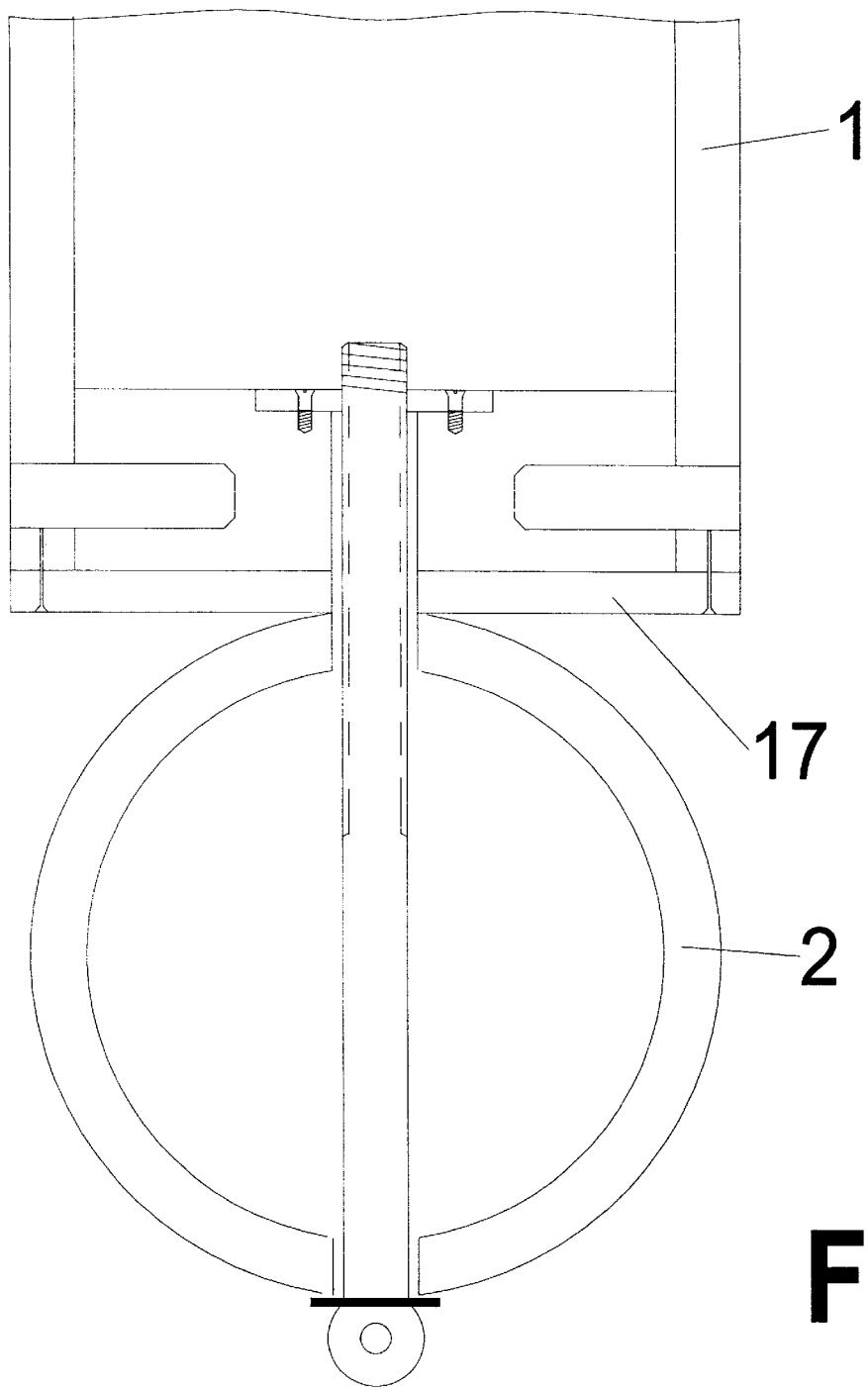
FIG. 4 is a structure similar to that shown in FIG. 3 with bamboo tubes which are not adapted in shape to each other.

Reference will now be made to FIG. 4 showing a bamboo tube connection which differs from the structure shown in FIG. 3 once again in that the bamboo tube 1 is not adapted in shape at its end to the external contour of the second bamboo tube 2, but is cut to length to provide a flat end face, being closed by means of an end plate indicated at 17. The foregoing description relating to the end plate 17 and the bamboo tube 1 shown in FIG. 2 also applies to this embodiment.

Figure 5:
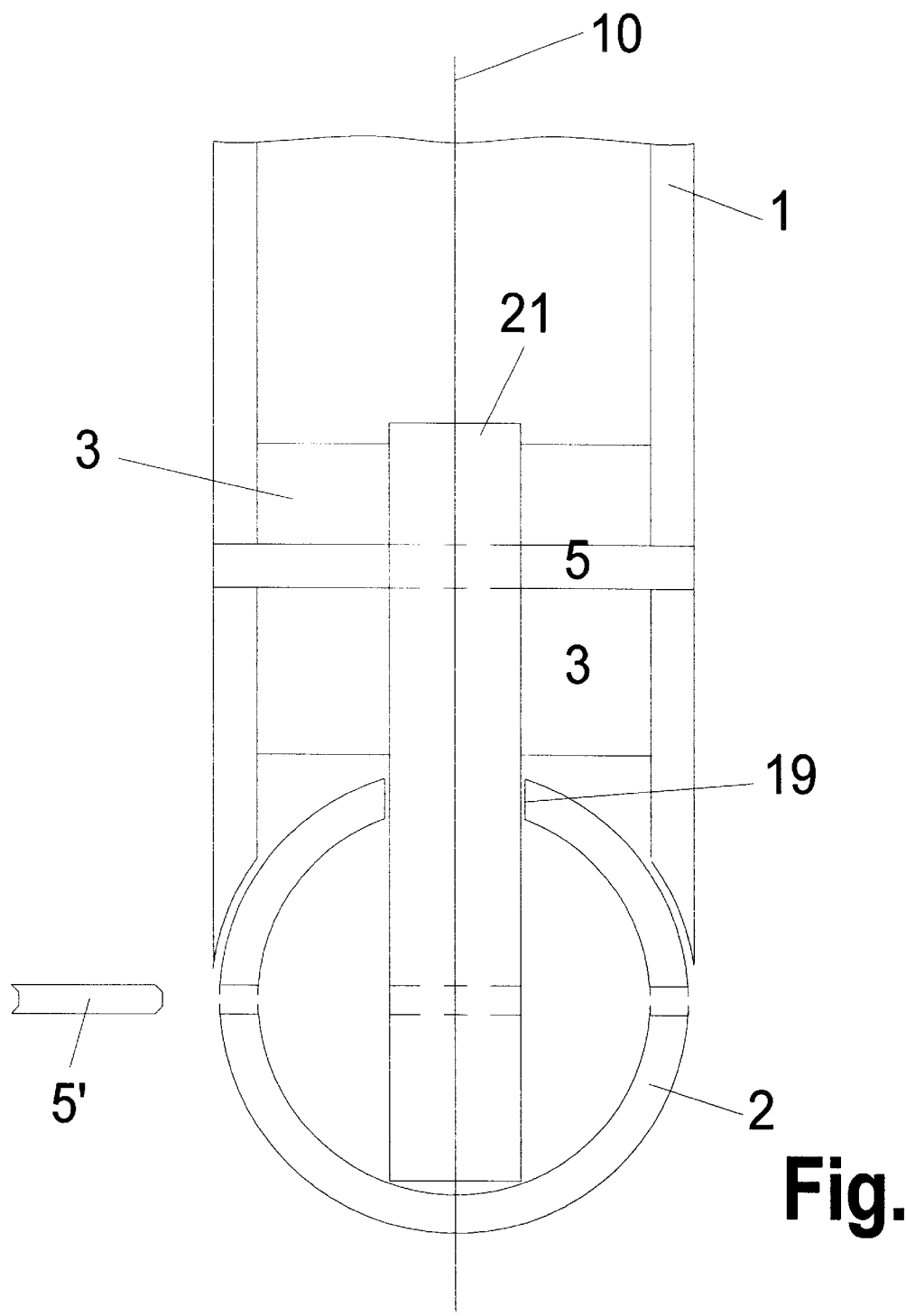
FIG. 5 shows an internally disposed corner connection afforded exclusively by means of transverse dowels or pin members.

FIG. 5 shows another structure which is similar to that shown in FIG. 1, but in this case the longitudinal connector used is not in the form of a longitudinal screw but a longitudinal dowel or pin member as indicated at 21, which is fixed in the longitudinal direction 10 and which projects towards the second bamboo tube 2 to such an extent that it extends into the interior of the bamboo tube 2, to a location close to the oppositely disposed wall of the bamboo tube 2.

The longitudinal dowel 21 is non-rotatably fixed in the longitudinal insert member 3 and the latter is in turn non-rotatably fixed in the first bamboo tube 1, by the insertion of a transverse dowel or pin member 5 which passes through all three components, namely the longitudinal dowel 21, the insert member 3 and the tube 1, from one side of the tube 1 to the other. The wall of the bamboo tube 2, that is towards the bamboo tube 1, has a transverse bore 19 of sufficiently large size to allow the longitudinal dowel or pin member 21 to pass therethrough.

The longitudinal dowel 21 is fixed in the second bamboo tube 2 by passing therethrough a further transverse dowel or pin member as indicated at 5' in FIG. 5, in parallel relationship with the first transverse dowel or pin member 5, but in this case through the bamboo tube 2, more specifically preferably in the region of the largest diameter thereof. The dowel 5' at the same time passes through the tube 2 and the longitudinal dowel 21 which for that purpose also has a suitable transverse bore. The transverse dowel 5' preferably extends from one side of the bamboo tube 2 to the other and passes through the wall thereof at both sides thereof.

Figure 6:
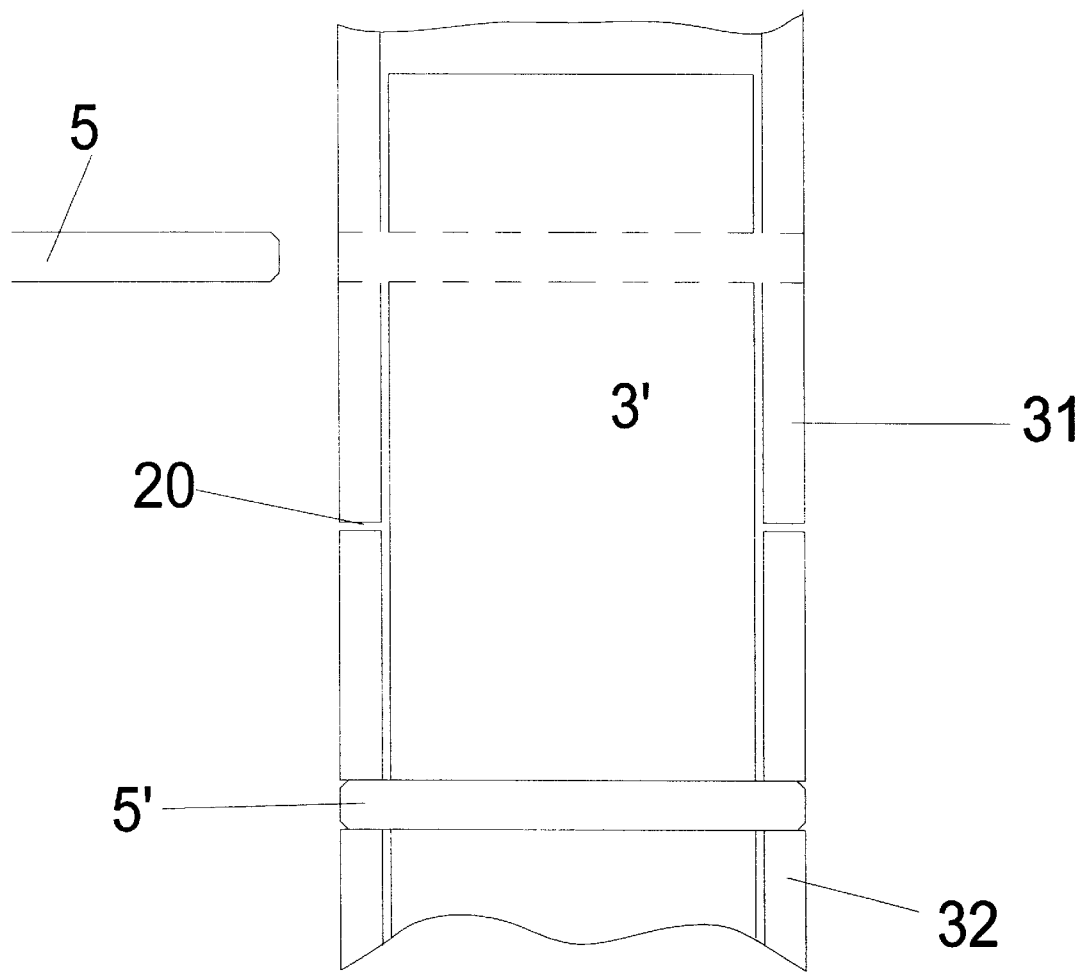
FIG. 6 shows a structure involving tube prolongation.

FIG. 6 shows an alternative embodiment for extending the length in respect of a third tube indicated at 31, with a fourth tube indicated at 32 which is fitted in aligned relationship therewith, the two tubes 31 and 32 preferably being of the same diameter, more specifically in respect of inside and outside diameters. In this arrangement a longitudinal insert member 3' is arranged in the interior of the two aligned tubes so that it extends across the join or gap as indicated at 20 in FIG. 6 between the two aligned tubes 31 and 32. Both in the tube 31 and also in the tube 32, the insert member 3' is secured to be non-rotatable and also fixed in relation to the longitudinal direction of the tubes, by at least one respective transverse dowel or pin member 5, 5' which is fitted transversely both through the corresponding tube and also through the insert member 3'.

In order to achieve a connection with the minimum possible amount of play, in the structures as shown in FIGS. 5 and 6, the corresponding transverse bores in the tubes 1, 2 and 31, 32 respectively and in the longitudinal insert member 3 and in the longitudinal dowel member 21 of FIG. 5 must be matched as accurately as possible to the outside diameters of the transverse dowels 5, 5'.

The same also applies to the transverse dowels 5 and the further dowels 5" which extend transversely through the transverse dowels 5, in the structure shown in FIG. 7 to which reference will now be made.

Figure 7:
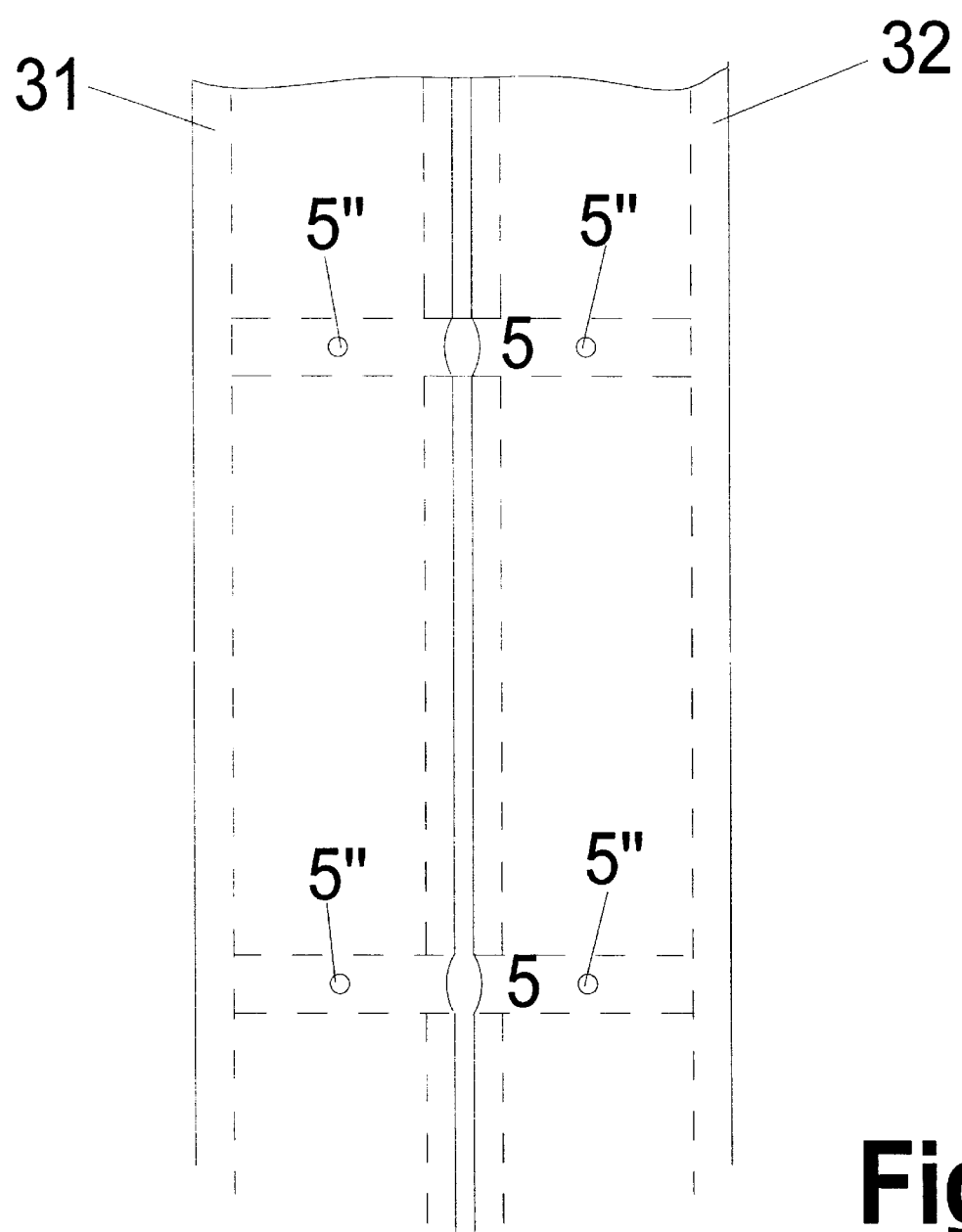
FIG. 7 shows a connection between tubes arranged in parallel relationship.

In the FIG. 7 arrangement, two tubes 31 and 32 which extend in mutually parallel relationship and which preferably bear against each other are connected together by two transverse dowels or pin members 5 which are arranged at a spacing in the longitudinal direction and which pass through the mutually adjoining walls of the aligned tubes 31 and 32, passing through corresponding transverse bores therein, but not the mutually remote sides of the walls of the tubes 31 and 32. The transverse dowels 5 are fixed in that condition by insertion of the further dowels 51" which in turn extend transversely with respect to the transverse dowels 5 in each of the tubes 31 and 32. The further dowels 5" also extend through the walls of the corresponding tubes 31 and 32 and thus the arrangement overall provides a connection between the two tubes 31 and 32 which is non-rotatable, axially fixed and in positively locking relationship. In all cases the inserted dowels or pin members can additionally also be glued in position.

All the above-described connections according to the invention are thus disposed very substantially in the interior of the bamboo tubes and thus are invisible therein. Only the outer ends of the transverse dowels 5 or the further transversely extending dowels 5" or the head 4a of the longitudinal screw 4 can be seen from the exterior.

Figure 8:
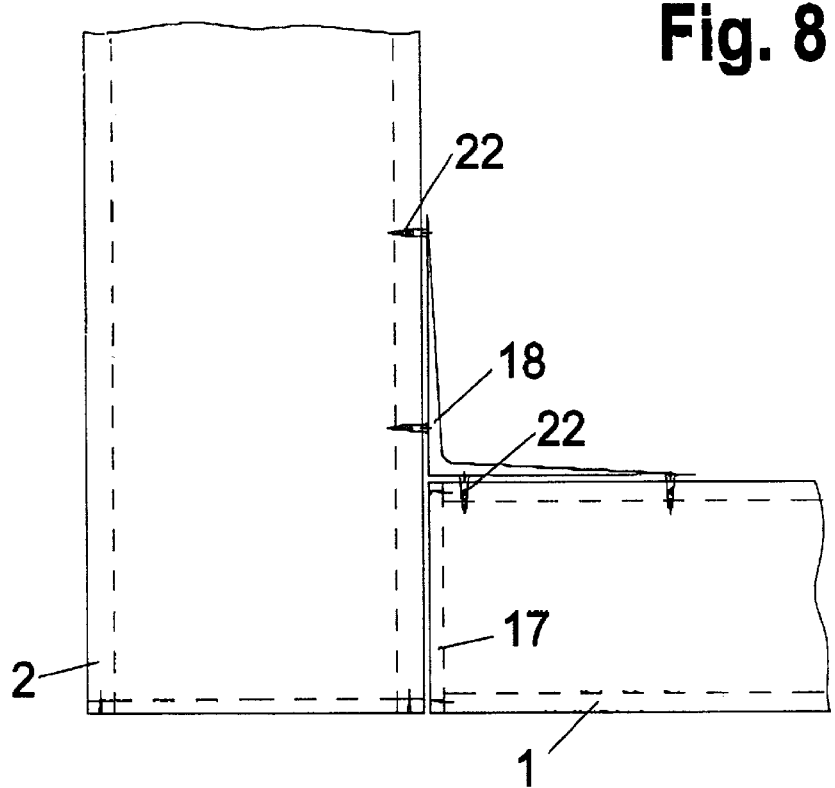
FIG. 8 shows a corner connection arranged externally on bamboo tubes at a right angle.

Reference will now be made to FIG. 8 which in contrast shows a corner connection between first and second bamboo tubes indicated at 1 and 2, in which the connecting elements are not fitted in the interior of the tubes 1 and 2 but are applied to the exterior thereof, although in the internal angle of the bamboo tubes 1 and 2 which are fitted together at a right angle. When dealing with articles of furniture such as bed frame structures, chair support structures and the like, that is also a possible option by virtue of the top side of such items of furniture being covered by mattresses, seat cushions and the like.

The bamboo tubes 1 and 2 are in mutually butting relationship at a right angle and are each preferably additionally closed at their free ends by end plates 17 fitted thereto, as described hereinbefore for example with reference to FIG. 4. The connection is made by fitting a per se known angle assembly member indicated at 18 in FIG. 8 to the outside surfaces of the bamboo tubes 1 and 2, in the interior of the angle which they define. The angle assembly member 18 is also connected in per se known manner to the bamboo tubes 1 and 2 by fixing screws 22 which extend through the angle assembly member 18 and into the walls of the bamboo tubes 1 and 2.

Figure 8A:
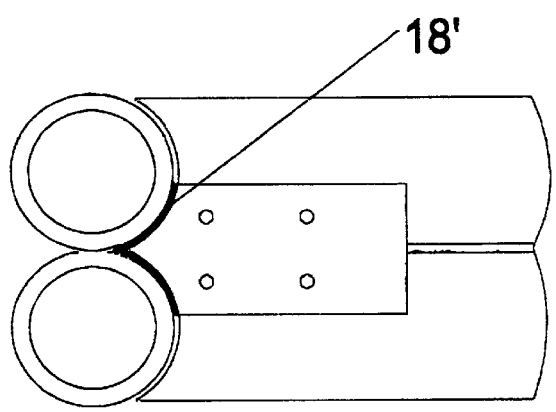
FIG. 8*a* shows another form of corner connection.
Figure 8B:
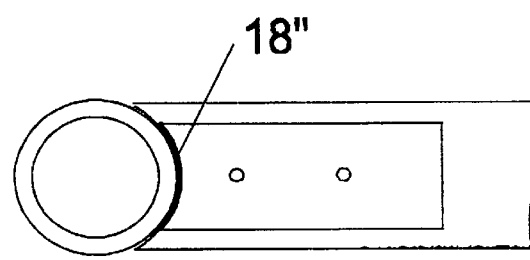
FIG. 8*b* shows still another form of a corner connection.

It will be seen from FIGS. 8a and 8b however that it is furthermore possible to achieve an additional advantage by virtue of specific profiling imparted to the angle assembly members 18 to adapt them to the configurations of the bamboo tubes to be connected together, and suitable positioning of the angle assembly members.

Referring therefore to FIG. 8a, shown therein is a side view of two mutually superposed layers, each layer consisting of first and second bamboo tubes which are disposed at a right angle to each other. Reference 18' denotes an angle assembly member which is arranged in the right-angled corner between each two adjacent tubes and which also extends over the respective mutually adjacent bamboo tubes at each side of the right-angled configuration. Accordingly, the angle assembly member 18' can connect together a total of four bamboo tubes, that is to say two angle connections which are disposed in mutually superposed relationship, thereby readily resolving the problem of connecting a plurality of such angle configurations together in mutually superposed relationship.

For that purpose the angle assembly member 18' is of a substantially V-shaped cross-sectional contour which can be inserted into the internal angle between two mutually superposed corner connections of bamboo tubes 1, 2. The limbs of the V-shape may additionally be of a slightly curved configuration, to correspond to the curved external contour of the bamboo tubes 1, 2 which are to be connected together.

Screws can be passed through the limbs of the V-shaped contour of the angle assembly member 18 for screwing same both with respect to the upper and also the lower bamboo tube of the two corner connections which are disposed in mutually superposed relationship, as shown in FIG. 8a.

In the structure shown in FIG. 8b, a corner connector in the form of an angle assembly member 18" is used to connect only a first bamboo tube 1 and a second bamboo tube 2 together in a respective angled configuration. The angle assembly member 18" is of a cross-sectional profiling in the form of an outwardly facing channel configuration to correspond to the curvature of the tubes 1 and 2 which are to be connected together at a right angle. Instead of a channel-shaped curved configuration the cross-sectional shape of the angle assembly member 18" may also be V-shaped with curved limbs so that the free limbs of the V-shape bear against the outside surfaces of the round contour of the respective bamboo tubes.

It will be appreciated that the above-described constructions in accordance with the principles of the present invention have been set forth solely by way of example and illustration of the present invention and that various modifications and alterations may be made therein without thereby departing from the spirit and scope of the invention. Thus for example it has been mentioned above that the longitudinal insert member 3 and/or the transverse insert member 15 may comprise wood, but more specifically they may comprise bamboo, more specifically consisting of a plurality of glued bamboo bar members or slats.

What is claimed is:

1. A bamboo tube connection comprising
   a first bamboo tube having an end region,
   a second bamboo tube, the first bamboo tube meeting the second bamboo tube in butting relationship at an angle between the first and second bamboo tubes,
   a longitudinal insert member in the form of a cylindrical portion fixed in the end region of at least the first bamboo tube, and
   a longitudinal connector which releaseably connects the longitudinal insert member of the first bamboo tube to the second bamboo tube, wherein the longitudinal insert member is so positioned in the longitudinal direction in the first bamboo tube that when the first and second bamboo tubes are connected together the second bamboo tube has a peripheral surface portion thereof pressed against an end face of the longitudinal insert member, without the insert member contacting an end face of said first bamboo tube wherein the second bamboo tube maintains a spacing relative to the free end face of the first bamboo tube.

2. A bamboo tube connection as set forth in claim 1 wherein the longitudinal connector is arranged in the longitudinal direction of the bamboo tube carrying the longitudinal insert member.

3. A bamboo tube connection as set forth in claim 2 wherein the longitudinal connector is arranged centrally in the bamboo tube carrying the longitudinal insert member.

4. A bamboo tube connection as set forth in claim 2 wherein the longitudinal insert member is connected in positively locking relationship to the first bamboo tube, in particular to the inside periphery thereof, and in particular is connected by way of a transverse dowel element.

5. A bamboo tube connection as set forth in claim 2 wherein the longitudinal insert member is glued to the bamboo tube.

6. A bamboo tube connection as set forth in claim 1 including
a transverse insert member arranged in the interior of the second bamboo tube in such a longitudinal position which aligns with the longitudinal connector of the longitudinal insert member of the first bamboo tube, the transverse insert member being connected to the second bamboo tube.

7. A bamboo tube connection as set forth in claim 6 wherein the transverse insert member is glued to the second bamboo tube.

8. A bamboo tube connection as set forth in claim 6 wherein the transverse insert member is fixed to the second bamboo tube by fixing screws which are screwed from the outside into the second bamboo tube.

9. A bamboo tube connection as set forth in claim 6 wherein the transverse insert member comprises wood.

10. A bamboo tube connection as set forth in claim 9 wherein said wood comprises bamboo.

11. A bamboo tube connection as set forth in claim 9 wherein said wood comprises a plurality of glued bamboo bar members.

12. A bamboo tube connection as set forth in claim 1 wherein the longitudinal insert member comprises wood.

13. A bamboo tube connection as set forth in claim 12 wherein said wood is bamboo.

14. A bamboo tube connection as set forth in claim 12 wherein said wood comprises a plurality of glued bamboo bar members.

15. A bamboo tube connection as set forth in claim 1 wherein the longitudinal connector is non-rotatably connected to the longitudinal insert member.

16. A bamboo tube connection as set forth in claim 15 including
a transverse dowel by which the longitudinal connector is non-rotatably connected to the longitudinal insert member, the transverse dowel jointly passing through the first bamboo tube, the longitudinal insert member and the longitudinal connector.

17. A bamboo tube connection as set forth in claim 1 wherein the longitudinal connector projects in the transverse direction into the interior of the second bamboo tube and is adapted to be non-rotatably connected thereto.

18. A bamboo tube connection as set forth in claim 1 including
means connecting said longitudinal connector to said second bamboo tube in positively locking relationship.

19. A bamboo tube connection as set forth in claim 18 wherein said connecting means comprise a second bamboo tube transverse dowel.

20. A bamboo tube connection as set forth in claim 1 wherein the longitudinal connector is in the form of a screw having a head which bears against the end of the longitudinal insert member that is remote from the second bamboo tube and a nut adapted to be screwed on to the longitudinal screw to bear against that end face of a transverse insert member which is remote from the first bamboo tube.

21. A bamboo tube connection as set forth in claim 20 wherein the screw loosely passes through a longitudinal bore in the longitudinal insert member and has a free shank end with a male screw thread at least at said free end, and
the nut is non-rotatably connected to the transverse insert member, as by means of screws.

22. A bamboo tube connection as set forth in claim 20 wherein the shank of the longitudinal screw is adapted to be non-rotatably connected to the longitudinal insert member, for example by way of projections directed in the longitudinal direction, such as prongs between mutually contacting end faces of the longitudinal insert member and the head of the longitudinal screw, wherein the nut is freely rotatable with respect to the transverse insert member.

23. A bamboo tube connection as set forth in claim 20 and including
a wall opening in the wall of the bamboo tube in the region of the screw head of the longitudinal screw.

24. A bamboo tube connection as set forth in claim 20 including
a washer disposed between the screw head of the longitudinal screw and a portion supporting said screw head.

25. A bamboo tube connection as set forth in claim 1 wherein the longitudinal insert member is positioned in the longitudinal direction in the first bamboo tube in such a way that when the first and second bamboo tubes are connected together the second bamboo tube is pressed against the end face of the longitudinal insert member that faces towards it and in particular maintains a spacing relative to the free end face of the first bamboo tube.

26. A bamboo tube connection as set forth in claim 1 wherein a nut bears against the end face of the longitudinal insert member that is remote from the second bamboo tube and a screw head of a longitudinal screw of the longitudinal connector bears against the side of the outer peripheral surface of the second bamboo tube, which side is remote from the longitudinal insert member and thus the first bamboo tube, and the longitudinal screw passes through the second bamboo tube completely through transverse bores therein.

27. A bamboo tube connection as set forth in claim 1 wherein a screw head of a longitudinal screw of the longitudinal connector bears against the inside of the wall of the second bamboo tube and penetrates the second bamboo tube only at the side that is towards the first bamboo tube.

28. A bamboo tube connection as set forth in claim 1 including
at least one respective transverse dowel which penetrates the longitudinal insert member both in the region of the first bamboo tube and also in the region of the second bamboo tube and which also respectively passes through at least one wall of the respective bamboo tube and terminates at the outside periphery thereof.

29. A bamboo tube connection as set forth in claim 28 including
adhesive means joining the longitudinal insert member to one of the bamboo tubes.

30. A bamboo tube connection as set forth in claim 1
wherein a plurality of corner connections each comprising a first and a second bamboo tube are arranged in mutually superposed relationship in at least two planes and a respective angle assembly member is arranged in the contact planes between two such corner connections and the angle assembly member has a cross-sectional contour in the form of an outwardly facing V-shape which is in the angle between two tubes which bear against each other.

31. A bamboo tube connection as set forth in claim 1 and further including
a third bamboo tube,
a fourth bamboo tube,
a longitudinal insert member fixed in the end regions of at least one of the first and second bamboo tubes,
wherein the first bamboo tube and the second bamboo tube are aligned with each other in the longitudinal direction and the longitudinal insert member extends beyond the join between the mutually facing ends of the first and second bamboo tubes in the interior thereof.

32. A bamboo tube connection as set forth in claim 31
wherein the longitudinal insert member is non-rotatably and axially fixedly connected with respect to the bamboo tubes.

33. A bamboo tube connection as set forth in claim 1 and further including
a third bamboo tube,
a fourth bamboo tube,
means providing a releaseable bamboo tube connection to a third bamboo tube and a fourth bamboo tube which are arranged in mutually parallel relationship,
at least one transverse dowel which passes through the walls of the bamboo tubes at least at the point of contact of the two peripheral surfaces thereof thereby to connect the bamboo tubes together in longitudinally fixed and non-rotatable relationship.

34. A bamboo tube connection as set forth in claim 33 and further including
at least first and second transverse dowels disposed at a spacing relative to each other axially in the direction of the bamboo tubes and in particular in mutually parallel relationship.

35. A bamboo tube connection as set forth in claim 1 and further including
a third bamboo tube,
a fourth bamboo tube at an angle to the third bamboo tube,
an angle assembly member disposed in the internal angle between the bamboo tubes, and
means for screwing the angle assembly member to the bamboo tubes.

36. A bamboo tube connection as set forth in claim 35
wherein the cross-sectional shape of the angle assembly member is matched to the external contour of the bamboo tubes to be connected together.

37. A bamboo tube connection as set forth in claim 1 and further including
a third bamboo tube,
a fourth bamboo tube,
an angle assembly member arranged on the central plane of the bamboo tubes, the angle assembly member being of an outwardly concave cross-sectional shape.

38. An arrangement for making a bamboo tube connection between first and second bamboo tubes which meet with the first bamboo tube in butting relationship at an end region thereof with the second bamboo tube at an angle between the first and second tubes, including
a longitudinal insert member having an end face and fixed in at least the first bamboo tube in said end region thereof and
a longitudinal connector having means adapted to at least indirectly releaseable connect the longitudinal insert member of the first bamboo tube to the second bamboo tube,
wherein in the assembled condition of the arrangement with the bamboo tubes the longitudinal insert member is so positioned in the longitudinal direction in the first bamboo tube that the second bamboo tube has a peripheral surface portion thereof pressed against an end face of the longitudinal insert member without the insert member contacting an end face of said first bamboo tube wherein the second bamboo tube maintains a spacing relative to the free end face of the first bamboo tube.

39. A bamboo tube connection device, comprising;
a first bamboo tube structure having an end region;
a second bamboo tube structure providing in butting relationship at an angle between the first and second bamboo tubes;
an cylindrical insert means longitudinal fixed in the end region of the first bamboo tube; and
a connector means longitudinally positioned for releaseable connecting said insert means to said second bamboo tube,
wherein said insert means is positioned in a longitudinal direction in said first bamboo tube whereby when said first and second bamboo tubes are connected together said second bamboo tube has a peripheral surface portion pressed in an end face of said insert means without said insert means contacting an end face of said first bamboo tube wherein the second bamboo tube maintains a spacing relative to the free end face of the first bamboo tube.

* * * * *